United States Patent [19]

Schmidt et al.

[11] 4,434,536
[45] Mar. 6, 1984

[54] LOCKING SNAP HOOK

[75] Inventors: Terrance L. Schmidt, Littleton; Wayne L. Olson, Evergreen, both of Colo.

[73] Assignee: Rose Manufacturing Company, Englewood, Colo.

[21] Appl. No.: 433,873

[22] Filed: Oct. 13, 1982

[51] Int. Cl.³ .................................... A44B 13/02
[52] U.S. Cl. .......................... 24/241 PP; 24/241 P
[58] Field of Search ........ 24/241 SB, 241 PP, 241 P, 24/241 SP, 241 PS, 241 PL

[56] References Cited

U.S. PATENT DOCUMENTS

| 527,286 | 10/1894 | Perkins et al. | 24/241 P |
|---------|---------|----------------|----------|
| 815,723 | 3/1906 | Mahoney | 24/241 P |
| 1,682,617 | 8/1928 | Jensen et al. | 24/241 PP |
| 1,879,167 | 9/1932 | Freysinger | 24/241 P |
| 1,879,168 | 9/1932 | Freysinger | 24/241 SB |
| 2,706,318 | 4/1955 | Coffing | 24/241 SB |
| 3,831,994 | 8/1974 | Mardin | 24/241 PS |
| 4,062,092 | 12/1977 | Tamada et al. | 24/241 SB |
| 4,122,585 | 10/1978 | Sharp et al. | 24/241 SB |
| 4,320,561 | 3/1982 | Muller et al. | 24/241 PS |

FOREIGN PATENT DOCUMENTS 1044762 10/1966 United Kingdom .......... 24/241 SB

Primary Examiner—Paul J. Hirsch
Attorney, Agent, or Firm—Jerry W. Berkstresser

[57] ABSTRACT

A positively locking snap utilizing a conventionally shaped snap hook having a normally open hook end portion which is opened and closed to receive and discharge a line or other fixture by movement of a U-shaped spring biased closure pivotally connected to the snap body at a position remote from the open hook portion, the U-shaped spring biased closure extending beyond the body of the snap hook on the side opposite to the open hook end and capable of being moved in a direction away from the hook end portion about the pivot to open the snap hook end portion when a locking member received between the snap hook body and the spring biased closure on the hook side of the snap hook body is moved from a position where it interferes with the movement of the spring closure to a position where is does not interfere with that movement, the movement of the locking member being facilitated by the provision of an exposed lateral extension of the member extending beyond the spring biased closure toward the end of the snap hook opposite from the hook end portion.

7 Claims, 4 Drawing Figures

LOCKING SNAP HOOK

BACKGROUND OF THE INVENTION

Field of the Invention

The present invention relates to snap connectors for use at the ends of rope, cable, chain, or other lines and more particularly to spring latched snap connectors wherein the latching mechanism is locked against inadvertent release.

There is a great variety of available spring biased snaps for connecting lines to receiving rings or other lines or other fasteners. In particular, where attachment to a drop line or anchorage line with a connecting line or lanyard is important in for example, personal fall protection equipment, it is desirable to have a snap connector which is capable of easy actuation for engagement and disengagement while providing a secure latching and locking function. This is necessary to prevent inadvertent actuation of the latch and possible disengagement from whatever support to which the snap has been attached. Conventional snaps have typically used latches which are spring biased in the latched position with an inverted U-shaped latching member or gate that is pivoted at one end about a pin or axis received through the forged body of the snap and is urged by arcuate movement into latched engagement by a spring bearing on the body of the snap and the top of the inside of the U-shaped member. The physical shape of the tip or nose of the hook body engaging the tongue of the U-shaped member and the member itself are generally preselected to cooperate with each other to prevent lateral forces from disengaging the gate from the latched condition. Such devices have generally been used with great success, however some conditions are encountered in use where the spring biased member or gate can be inadvertently depressed so as to disengage the aforementioned interlocking relationship and even depress the spring biased latching member sufficiently to permit the line or fastener to which the snap is attached to slip free from the snap under some circumstances. This can defeat the latching function of the snap and produce undesirable results depending on the application of use.

It is therefore an objective of the present invention to provide a snap with a latching and locking mechanism that combines the spring biased latching function of the previously employed U-shaped member with an additional positive locking mechanism that avoids the problems of inadvertent actuation of the spring biased latching mechanism previously widely used.

In addition it is an objective of the present invention to provide a U-shaped spring biased latching member that in concert with the additional locking mechanism provides the desirable feature of one-handed operation, with either thumb or finger actuation.

Brief Description of the Invention

DETAILED DESCRIPTION OF THE INVENTION

Figures 1, 4:
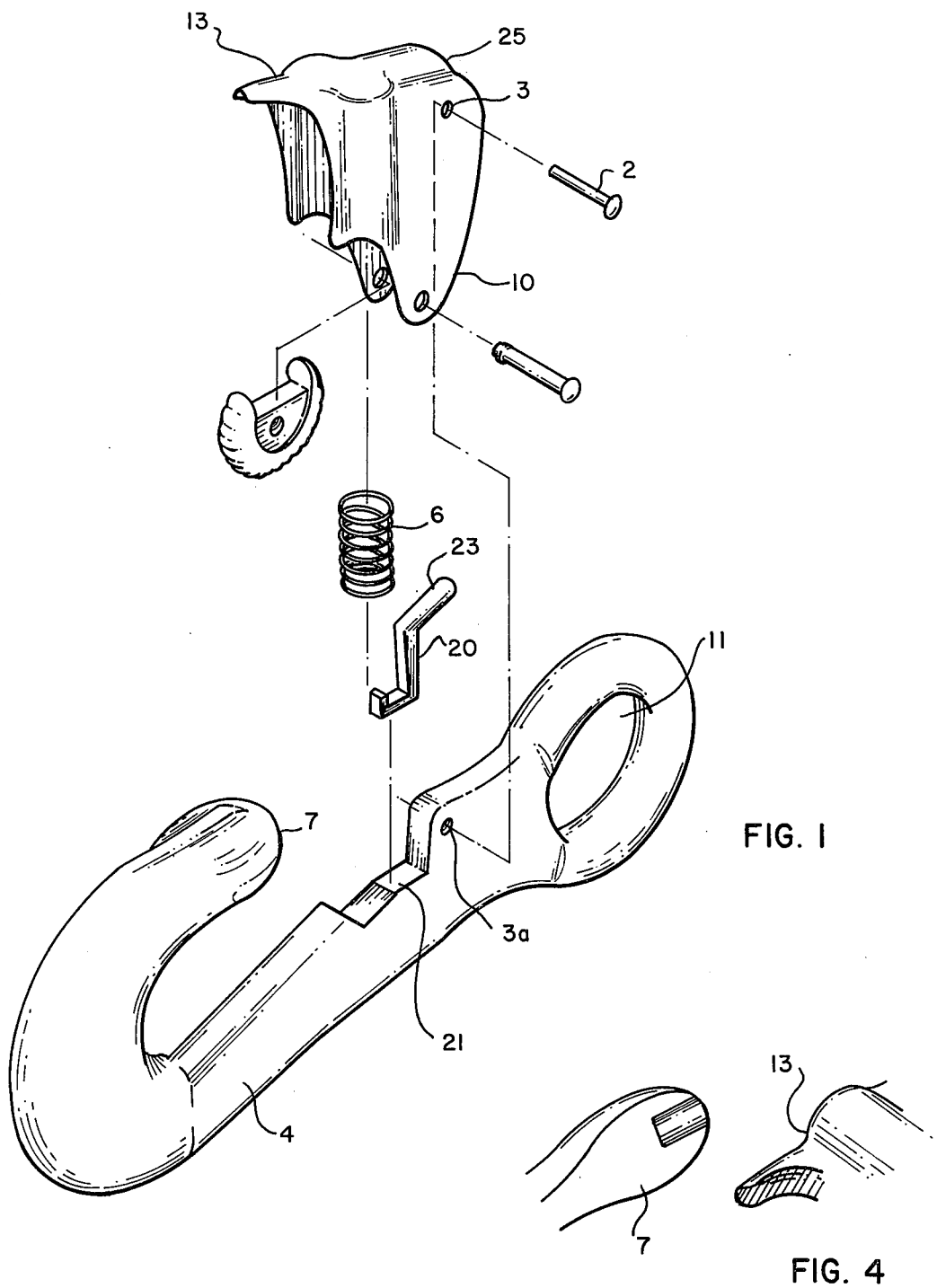
FIG. 1 is an exploded perspective view of the component parts of the latching and locking mechanisms of the present invention.
FIG. 4 is a fragmentary view of the nose of the snap hook showing the engagement structure contained therein and the complimentary shape of the tongue of the spring biased closure.

In FIG. 1 the exploded component parts of the locking snap of the present invention are shown. The inverted U-shaped latching member or gate 1 is arcuately pivoted about a pivot pin 2 received in the holes 3 in gate 1 and a hole 3a in the body of hook 4. The gate 1 is also sized so as to permit the arms of the open U-shaped cross-section to protrude beyond the bottom of the body of snap hook 4 a sufficient distance to provide an extension which can be finger or thumb actuated at 10 (or the grip 30) so that a hand holding the hook body 4 and the line which is received through the hole 11 can actuate the spring biased latching member 1 by rotating the latching member 1 about the pivot pin 2 such that the tongue 13 of the latching member 1 is moved inwardly thereby compressing the latching spring 6, providing an opening between the nose 7 of snap hook 4 and the gate 1 so as to receive a line or other fixture. When actuated as described the snap hook is able to receive a line, fastening ring or the like or enable the user of the hook to disengage the hook from whatever fixture of line to which it was attached.

An important and novel feature of the present invention is the provision of the previously described structure with a generally J-shaped locking member 20, having a lateral extension 23.

Figure 2:
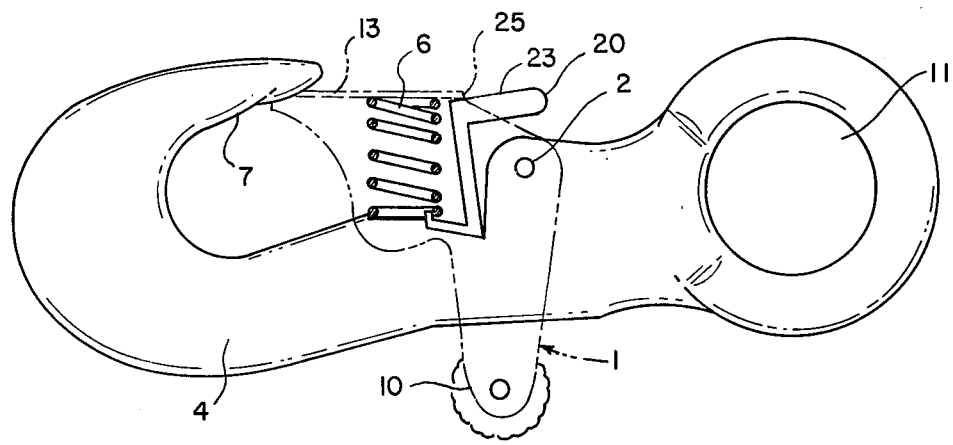
FIG. 2 is a partially broken view of the components in place which provide the latching and locking function of the snap of the present invention in a locked position.
Figure 3:
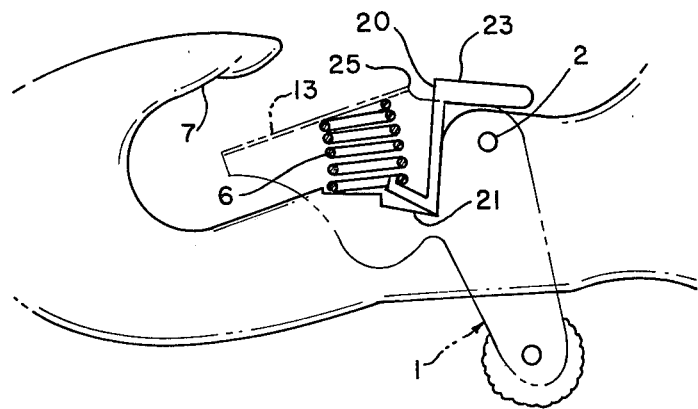
FIG. 3 is a partially broken view of the components in place which provide the latching and locking function of the snap of the present invention in an unlocked position.

This member 20, is shaped to be received within the U-shaped latching member or gate 1, so that the heel of the J-shaped member engages a pocket 21 (as shown) which is provided in the body of snap hook 4. The bottom hook-shaped portion of the J-shaped member 20 is also adapted to engage at least one coil of the spring 6 and the lateral extension of the top of the J-shaped member, is adapted to engage the edge 25 of the U-shaped latching member 1 where shown in FIG. 2. The size and position of the J-shaped member 20, the depth of the pocket 21, its shape in relationship to the shape of the heel of the J-shaped member and the distance of the pocket 21 to the lip of the edge 25 in combination with the dimension of the vertical arm of the J-shaped member are all preselected to provide the following described function. When the J-shaped member 20 is in its normal locked position, as shown in FIG. 2, it is urged into this position by the biasing force of the spring 6 on the portion of the hook-shaped portion of member 20 engaging the spring 6. In this positon the lateral extension 23 of the T-shaped top of the J-shaped member 20 interferes with the rotation of U-shaped latching member 1 so as to prevent the opening of the nose portion 7 of hook 1. When the exposed portion of the lateral extension of J-shaped locking member 20 is physically depressed toward the hook body 4, it is arcuately moved by the heel pivotally moving in pocket 21 to a position where the surface of 23 no longer interferes with surface 25 and the depression of the portion 13 of spring biased latching member 1 is possible. The opening of the hook portion is then accomplished when the spring 6 is depressed so that the snap hook 4 can receive or discharge a line, fixture or the like or the like simply by physically pushing down on the portion of latching member 1 as conventionally done with a spring biased snap hook or by pulling back, toward the hole 11 in the hook 4, on the exposed portion 10 of latching member 1, for example with the users thunb or forefinger depending on how the hook is held.

In operation, simply depressing the exposed portion of J-shaped latch lever 20 unlocks the latching member 1. In addition, the provision of an extension of the latching member 1 below the lower extremity of the body 4 of the hook in the manner shown permits one handed operation of the snap hook once the J-shaped member has been activated by depressing the lateral extension 23.

The positive locking snap hook of the present invention can be used in circumstances where it is inconvenient or otherwise undesirable to tolerate the normal conventional two-handed operation of a snap i.e. where the rope or other fixture to which it is to be attached has to be secured against unwanted movement as by holding during the engagement of the snap. Further, the device of the present invention, as described, can be constructed so that the actuation portion of the locking member when depressed can be brought into close proximity to the body of the snap and the other elements sized within modest manufacturing tolerance requirements so as to provide a structure with few open areas. In addition, the extension of the arms of the inverted U-shaped member beyond the lower extremity of the snap body (as shown) can be sized and shaped for actuation in nearly any manner selected by the user when grasping the snap. hook. The device described is therefore capable of being manufactured in a wide variety of sizes for particular uses or applications which favor the use of a snap hook using the structure described. Further, the new shape of the nose of the snap hook shown in FIG. 4, providws for better restraint of lateral movement of the tongue of the gate thereby helping to provide a secure latching of the snap hook. The structure shown is capable of performing the described function in paricular applications by the selection of a wide variety of materials whose physical properties are structurally and functionally capable of fulfilling the particular design requirements of use. A wide variety of metals, plastics, ceramics and other materials are therefor contemplated to be capable of use in various components of the present invention. Likewise, the specific form of any part of the structure may be changed, for example the coil spring may be substituted with a wide variety of spring structures with whatever attendant changes that would require without departing from the spirit of the invention as described herein.

The present invention has been described in its preferred embodiments to describe all of the features which it can contain. It will be readily appreciated that certain features can be deleted and others added without departing from the basic novel structure and function described and claimed herein. It is not intended that the invention is limited by the foregoing description but only by the prior art insofar as it restricts the appended claims.

What is claimed is:

1. A locking snap hook comprising:
    a snap hook body having an open hook shaped end having pivotally attached thereto a spring biased latching means for closing the open portion of the hook;
    said spring biased latching means including a latch body, spring means within said latch body for urging said latch body into a position where the open hook shaped end of the snap book body is closed by said latch body; and
    locking means at least partially received within said latch body and cooperating with said snap hook body and with the spring means and the latch body for alternatively permitting opening and closing of the open portion of the hook shaped end of the snap hook body by said latching means; and
    wherein said locking means is capable of occupying at least two different positions and when in a first position a portion of said locking means rests in a recess in said snap hook body proximate to the pivotal attachement of said latch body to said snap hook body, while another portion or said locking means engages a portion of said body in a manner to interfere with the movement thereof and when in a second position said locking means rests in said recess in said snap hook body in a manner such that the remainder of said locking means does not interfere with the movement of said latch body; and
    said spring means within said latch body cooperates with said locking means, said latch body and said snap hook body so as to urge movement of said latching means about its pivot connection to the snap hook body to effect closure of the open portion of the hook shaped end with the latch body.

2. The snap hook of claim 1 wherein said locking means is generally in the form of a partially J-shaped member where the heel of the J-shaped member is received in said recess in said snap hook body and the hook-shaped lower extremity of said J-shaped member engages at least a portion of said spring and where a lateral extension from the top of said J-shaped member extends beyond the body of said latching means so as to be actuatable to its unlocked position by movement of the lateral extension of said J-shaped member toward the snap hook body.

3. A locking snap hook comprising:
    a hook body having an open hook shaped end portion having a hook shaped inside surface, a hook shaped outside surface, and hook lateral side surfaces connecting said inside surface and said outside surface, and a hook base portion integrally formed with said hook shaped end portion having a forward surface as an extension of said hook shaped inside surface, a rear surface as an extension of said hook shaped outside surface and lateral side surfaces connecting said forward surface and said rear surface;
    said hook shaped inside surface defining an open end portion of said hook body;
    spring biased latching means pivotally attached to said hook member about a latch pivot axis in a manner to be urged into a latch closed position to close said open hook shaped end portion of said hook body while being cpable of being pivotally moved by a user into a position inside of said open hook shaped and portion of said hook body to define a latch open position;
    locking means partially contained within the spring biased latching means for intefering with the opening of said latching means, said locking means having an interfering position in which said latching means is prevented from being moved from its latch closed position in which it closes the open hook shaped end portion of the hook body and a noninterfering position in which said latching means is freely moveable from such closed position to an open position, said locking means being spring biased in the interfering position;

wherein said spring biased latching means comprises a latch body and an elongate coil spring within said latch body cooperating with said locking means, said hook body and said latch body in a manner to maintain said latching means in such latch closed position;

wherein said latching means further comprises:
- a latch body having a U-shaped cross section containing two parallel arms connected at one of each of their extremities by a connection portion extending in a direction generally perpendicular to said longitudinal axis of said elongate coil spring, wherein said arms lie in planes adjacent and parallel to the lateral side surfaces of said hook body and in a partially overlapping relationship therewith, said elongate coil spring being enclosed within said latch body; and wherein said locking means comprises:
- a spring engaging member received in a recessed portion on the inside surface of said hook body end portion;
- wherein a portion of the lower extremity of said spring engaging member engages at least one coil of said elongate coil spring; and
- wherein an extension from the top of said spring engaging member extends beyond said latch body so as to be actuatable to a noninterfering position by movement thereof.

4. The invention of claim 3 wherein the arms of said latch body extend rearwardly of said rear surface in both the latch open position and the latch closed position; and wherein said latch body contains a latch movement means on the portion of the latch body extending beyond the rear surface of said hook body for pivotally moving said latch means from the latch closed position to the latch open position.

5. The invention of claim 4 wherein said latch movement means is thumb actuatable.

6. The invention of claim 5 wherein said extension of said spring engaging member is actuatable by a single finger of a human hand and wherein said latch movement means is actuatable by a thumb of the same hand whereby said locking means may be actuated and said latch movement means may be actuated immediately thereafter by use of a single hand.

7. The invention of claim 6 wherein said locking means is positioned adjacent the point of pivotal attachment of said latch means to said hook body.

* * * * *

UNITED STATES PATENT AND TRADEMARK OFFICE
CERTIFICATE OF CORRECTION

PATENT NO. : 4,434,536

DATED : March 6, 1984

INVENTOR(S) : TERRANCE L. SCHMIDT, Littleton;
WAYNE L. OLSON, Evergreen, both of Colorado.

It is certified that error appears in the above-identified patent and that said Letters Patent are hereby corrected as shown below:

The Patent No. at the top of Sheet 1 of 2 and Sheet 2 of 2 of the drawings reads "4,444,536" and should read --4,434,536--.

Signed and Sealed this

Nineteenth Day of February 1985

[SEAL]

*Attest:*

DONALD J. QUIGG

*Attesting Officer*     *Acting Commissioner of Patents and Trademarks*